No. 858,177. PATENTED JUNE 25, 1907.
O. K. HARRY.
TRUCK OR TANK.
APPLICATION FILED APR. 28, 1905. RENEWED DEC. 12, 1906.
2 SHEETS—SHEET 1.
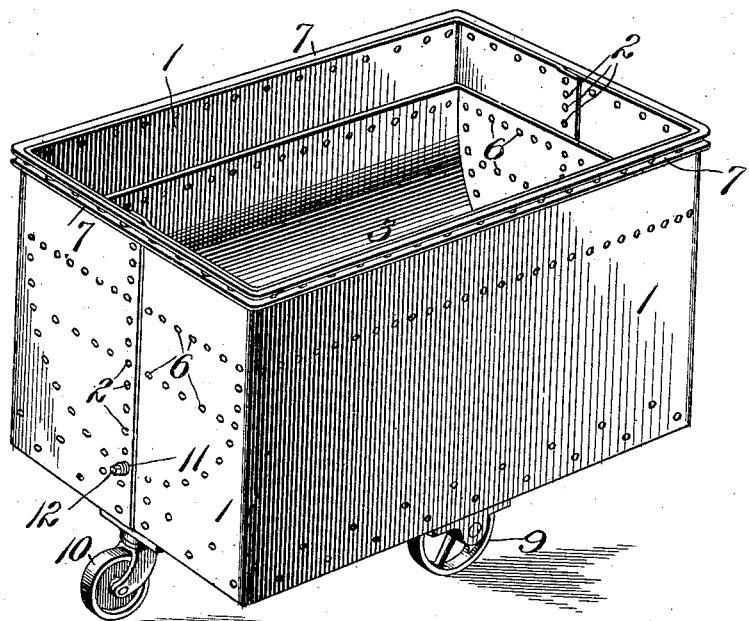
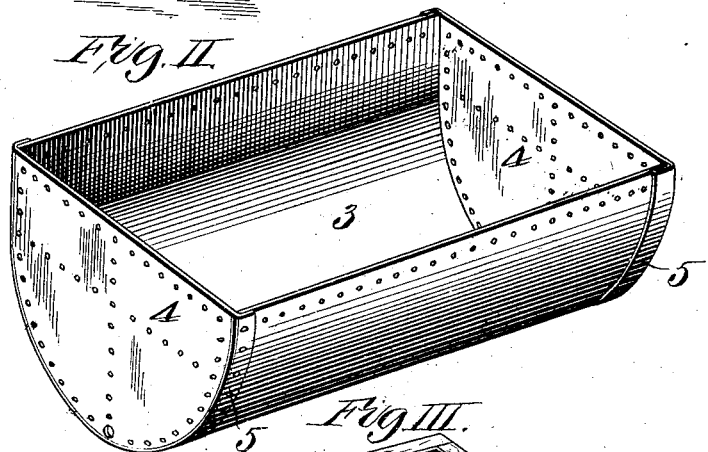
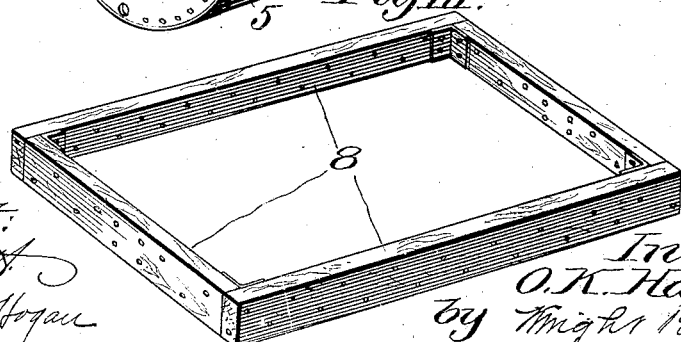
Attest:
Wm. H. Scott
Blanche Hogan
Inventor
O. K. Harry,
by Wright Bro.
attys.

No. 858,177. PATENTED JUNE 25, 1907.
O. K. HARRY.
TRUCK OR TANK.
APPLICATION FILED APR. 28, 1905. RENEWED DEC. 12, 1906.
2 SHEETS—SHEET 2.
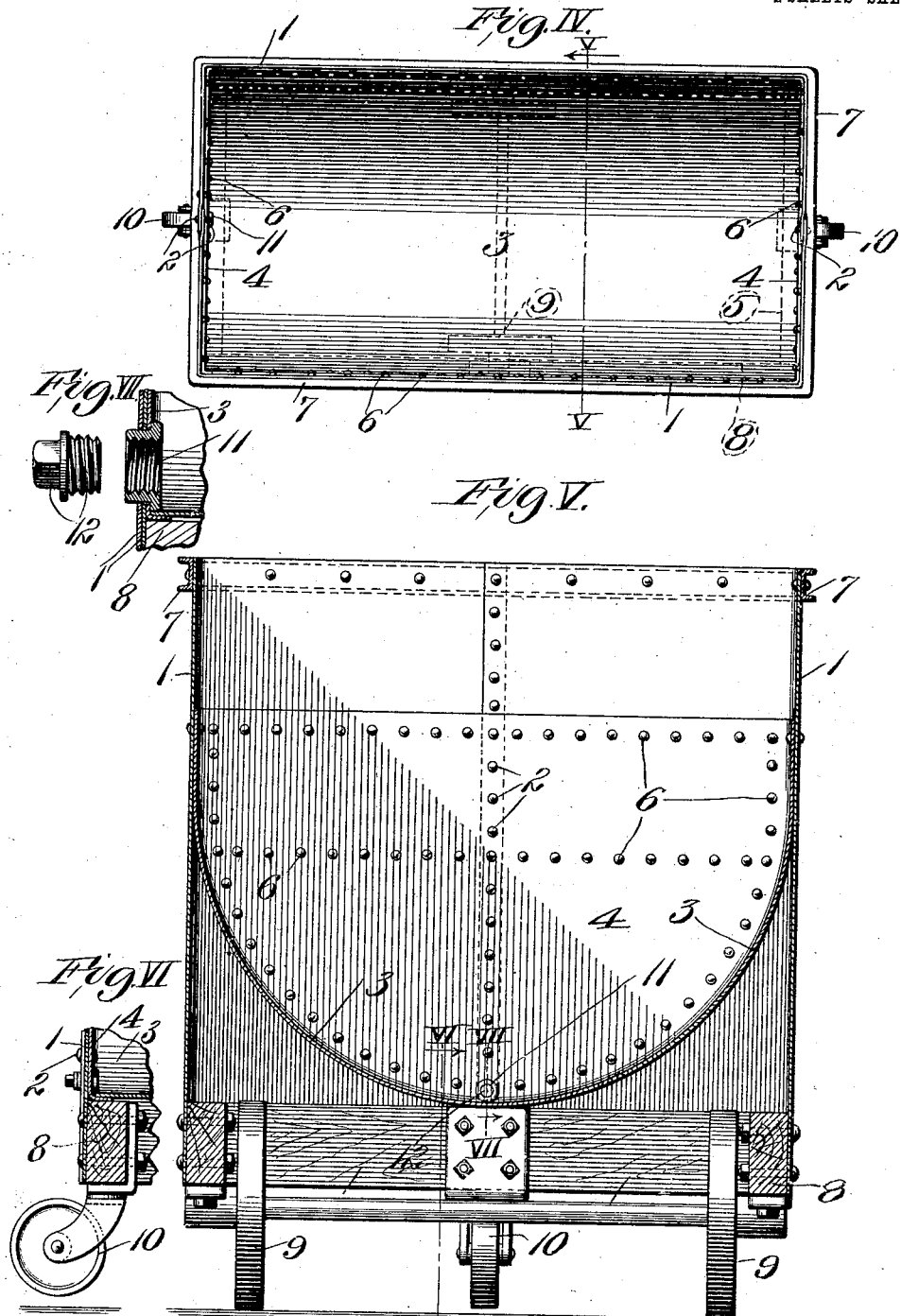

UNITED STATES PATENT OFFICE.

OWEN K. HARRY, OF ST. LOUIS, MISSOURI.

TRUCK OR TANK.

No. 858,177.  Specification of Letters Patent.  Patented June 25, 1907.

Application filed April 28, 1905. Renewed December 12, 1906. Serial No. 347,514.

*To all whom it may concern:*

Be it known that I, OWEN K. HARRY, a citizen of the United States, residing in the city of St. Louis, in the State of Missouri, have invented certain new and useful Improvements in Trucks or Tanks, of which the following is a full, clear, and exact description, reference being had to the accompanying drawing, forming part of this specification.

My invention relates to a truck or tank for conveying merchandise and other materials from place to place, the object of the improvement being to construct a truck or tank of the character named that will be both strong and durable; my truck or tank, to this end, consists of tank parts that are of sheet metal, and are firmly riveted to each other at their joints.

Figure I is a perspective view of my truck or tank. Fig. II is a perspective view of the sheet metal trough that constitutes the bottom of the tank. Fig. III is a perspective view of the bottom frame of the truck or tank. Fig. IV is a top view of the truck or tank. Fig. V is an enlarged vertical cross section taken on line V—V, Fig. IV. Fig. VI is a vertical section taken on line VI—VI, Fig. V. Fig. VII is an enlarged section taken on line VII—VII Fig. V through one of the end walls of the truck or tank at the location of the wash-out bushing therein, the plug that closes said bushing being shown withdrawn therefrom.

The side and end walls of the tank consist of metal sheets 1 that extend unbrokenly throughout the side walls and are bent at angles to the sides of the tank and continued at the ends of the tank to overlap each other. The ends of the sheets are united in their overlapped condition by rows of rivets 2. Within the tank side and end walls is a trough that consists of a semi-circular sheet metal central portion, the lapping of the end walls being secured through the medium of flanges 5 connected to the central portion by either seam joints or rivets. The trough is securely upheld within the tank side and end walls by rows of rivets 6 which are introduced through the tank walls and the walls of the trough. For the purpose of adding strength to the tops of the side and end walls of the tank, I rivet thereto a channel iron rim 7 that extends continuously around said walls.

8 designates a rectangular frame, preferably of wood, which is securely riveted to the side and end walls of the tank at their bottoms and which serves as a brace for said walls, and has the additional function of providing means for the attachment of truck wheels to the tank.

9 are main truck wheels mounted in boxes secured to the side rails of the frame 8, and 10 are casters secured to the end rails of the frame 8 and which serve to direct the travel of the truck when the tank is so used.

11 designates a bushing that is seated in a clean-out aperture extending through the end walls of the tank and the trough therein, and through which water may escape when the interior of the tank is being cleaned by washing it. The bushing 11 is normally closed by a screw plug 12.

I claim as my invention:

A tank truck comprising sheet metal side and end walls forming a continuous casing, a sheet metal trough permanently mounted between said side and end walls, a rectangular frame located within the lower ends of said side and end walls, and rollers journaled to said frame, substantially as set forth.

OWEN K. HARRY.

In presence of—
 E. S. KNIGHT,
 NELLIE V. ALEXANDER.